Patented Apr. 14, 1936

2,037,001

UNITED STATES PATENT OFFICE 2,037,001

ALCOHOLIC TREATMENT OF LIGNEOUS CELLULOSIC MATERIAL

Samuel I. Aronovsky, St. Paul, Minn., assignor to The Northwest Paper Company, Cloquet, Minn., a corporation of Minnesota No Drawing. Application July 18, 1934, Serial No. 735,881

21 Claims. (Cl. 92—9)

The present invention is related to extractive digestion of lignified vegetable matter with aqueous alcoholic liquor. It has particular reference to the separation of the non-cellulosic material and the cellulosic material, making a useful product of one or the other, and preferably of both. It also has reference to a process which facilitates the recovery of the useful products and of the alcohol employed.

Heretofore it has been proposed to treat wood and other lignified cellulosic material with aqueous alcohols with and without addition of other materials in lesser quantity for special benefits and modifications. It has been recommended that mono-hydroxy alcohols be used, and the use of methyl alcohol, ethyl alcohol, and glycerin have heretofore been described. All of these are miscible with water in all proportions at normal room conditions and also at the elevated temperatures used in the cooking operations.

As a result of use of such miscible alcohols and water, the waste liquor of the process is generally like the digestive liquor, in proportions of alcohol and water. The extracted materials which remain soluble in this liquor are recoverable in numerous ways, all of which eventually provide a mixture of water and alcohol from which it is difficult and expensive to recover alcohol or a suitable alcohol-water mixture for reuse. Dilution with water of such water-miscible alcoholic extract liquors throws out alcohol soluble material in such a way as to include much of water soluble materials present. The diluted alcohol as a by-product for the recovery of alcohol is not a desirable waste liquor.

The present invention aims to use alcohols which form with water homogeneous mixtures under the hotter conditions for digesting, and which separate into immiscible layers upon cooling after the cooking process is completed.

A further object of the invention is to so conduct the extractive process that changes in the cellulosic residue are minimized.

A particular object of the invention is the use of urea in the digestive process.

A specific object of the invention is the treatment of suitable woods or like material by a process providing a useful pulp, an alcoholic extract of non-cellulosic material, and an aqueous extract of non-cellulosic material.

A large number of experiments have been carried out using various alcohols with water, and from them some very important discoveries have been made. The normal homologous alcohols, methyl, ethyl, propyl, butyl and amyl, which have straight carbon chains, and the branched-chain alcohols, iso-propyl, iso-butyl, tertiary butyl, iso-amyl and tertiary amyl, have been found when mixed with water to have the same character of digestive or extractive power to remove non-cellulosic material from ligneous vegetable matter. It has been found from a study of aliphatic mono-hydroxy alcohols that alcohols which have the hydroxyl group on a terminal carbon of an aliphatic chain, in other words the primary alcohols, are more effective than the corresponding secondary or tertiary alcohols. It has also been discovered that such primary alcohols are more effective the longer the carbon chain. The molecule as graphically illustrated in the carbon chain form, may be likened to a crowbar of which the —OH group at the end is an effective wedge to separate the united constituents, being more effective the longer it is, or the longer is the chain of carbon atoms.

However, the physical properties of the alcohols vary with the length of the chain, and pertinent variations are in respect to its miscibility with water. The first three members, namely, methyl alcohol, ethyl alcohol and n-propyl alcohol, are miscible with water in all proportions at room temperatures and at higher temperatures. But the fourth and fifth members, n-butyl alcohol and n-amyl alcohol are not miscible with water in all proportions at lower temperatures, but become miscible with water at higher temperatures suitable for extractive processes of this invention. The same holds true for higher alcohols in the series such as hexyl and heptyl alcohols, the latter being insoluble in water at lower temperatures. Heptyl alcohol for example is three times as soluble in water at 100° C. as it is at 18° C. It is thus seen that in the straight-chain primary aliphatic alcohols there is a material change in pertinent properties beginning with the n-butyl member. Likewise the secondary and tertiary aliphatic alcohols have a change in properties as the carbon chain is lengthened. The iso-propyl alcohol and tertiary butyl alcohol have only a two-carbon chain and fall in the class which is completely miscible with water at lower temperatures. Iso-butyl alcohol and tertiary amyl alcohol have only three-carbon chains and fall in the class of those not completely miscible at lower temperatures. Iso-amyl alcohol has only a four carbon chain and is incompletely miscible with water at lower temperatures. It is thus seen that mono-hydroxy alcohols may be selected which have at least four carbon atoms of which at least three are in a straight chain. In other words both straight-chain and branched-chain alcohols may be used, so long as the group

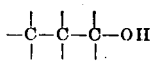

is present with a fourth carbon linked to this group.

In accordance with this invention therefore an alcohol for cooking is selected which provides aqueous alcohol at the cooking temperature, which aqueous alcohol separates into two layers at a lower temperature, one layer largely water, and the other largely alcohol. By reason of this the process may be so conducted that there is less tendency to precipitate extracted matter back onto the fiber, so that the extracted matter is dissolved largely in an alcohol stronger than that used in digestion, and so that the water soluble materials, such as acids, sugars, certain added chemicals and the like, may be removed in water solution and separated from the alcohol layer. It is thus possible to recover a purer extract of lignin or ligneous material than is possible where alcohols are used which are wholly miscible with water. It is also more economical to recover alcohol for reuse in the process.

It has also been discovered that the manner in which the alcohol extraction or digestion is carried out may be varied to render the extracted fiber more suitable for certain uses. Changing the proportions of alcohol and water has marked effect on the residual fiber. The kind of raw material, even differences in wood, has considerable influence on the results. Additions of certain modifying agents also may be made to control the action of the digestive process on the fiber and to control the changes or degradation of the various celluloses and pentosans therein. By careful control of the conditions the process may be operated to produce a pulp having qualities comparable to pulp produced from similar sources by strictly commercial chemical cooking processes, where use in paper-making is the objective. However, the same conditions which accomplish this result for one wood, say aspen, may not produce similar results for another wood, say jack pine, or spruce. For each wood other conditions may be determined.

By means of the present process an extract may be obtained which is perhaps lignin much more like the natural lignin than that derived by the action of inorganic chemicals on ligneous vegetable material. A residue resulting from evaporation of the alcohol may be brittle, hard, glossy and conchoidal in fracture. On heating it becomes plastic and moldable. When some alcohol is left in it, it may be soft and plastic while cool at room temperature. It has been used to cement fibers together, and such use is preferably accomplished by distributing it over fibers, or other bodies, while it is in solution or suspension in a liquid. By application of heat it can function in dry form, as a bonding agent for solid or fibrous particles. It may be applied from solution to form a weather-proofing coating, because it is water-resistant, and is highly resistant to effects of weathering. It has certain chemical properties and has been coupled with diazotized amines, such as sulphanilic acid, anthranilic acid, and benzidine to form dyestuffs. It has been condensed with an amine such as aniline to form a plastic. Many other uses for the extract are contemplated.

When the process is conducted with regard for producing a valuable pulp, it is of course necessary to separate extracting liquor and fiber in such a way that changed conditions at the time of separation do not cause removed extract to be again deposited on the fiber. Where pressure is employed in hot digestion and pressure is released, the extracting liquor cools. This cooling is likely to cause deposition of some extract back on the fiber. Such deposition is readily avoided by gradually replacing old extracting liquor with fresher extracting liquor, thus assuring a cleaner separation. Finally a water treatment alone may be used, such water to be employed later in blowing a digester. Thus the chips are more readily fiberized, and less alcohol is lost in the blowing process. Alcoholic liquor drawn from the digester when cooled readily separates into two layers in which extracted materials are selectively separated. Not only will there be dissolved extract, but there may be solid particles of ligneous materials which are in excess for complete solubility in the alcoholic layer, or in the aqueous layer.

It has also been found that the extraction for ligneous materials proceeds best in acidity. Acid may be added, but this is not necessary for the process generates acid, by decomposition of products in the original ligneous cellulose. These are probably formic and acetic acids, and in amount may be about .1% of dry wood used, calculated all as acetic acid. Acid goes into the water layer and is thus readily removable from the bulk of the extract of ligneous nature. It was also found that addition originally of more acetic acid has little effect to improve the process. However, material originally may be added to neutralize acid as it is formed, thus to prevent acidity, even to the point of providing alkalinity. Alkalis, such as caustic soda, sodium sulphide and sodium carbonate exert an inhibiting action on the process of extracting lignin.

The strong inhibitive action of such alkalis may be avoided and a lesser inhibiting action obtained by using urea as an agent to prevent acidity. Urea in relatively small quantities thus acts by neutralizing acid to minimize a hydrolytic action on the cellulosic material. Pulps digested in butanol-water mixtures, with urea, have a higher content of "Cross & Bevan" cellulose, of alpha cellulose, and of pentosans, than where urea is not used and higher acidity prevails. An ammonia odor is distinctly detectable in the hot liquors where urea is used. Urea in amount equal to less than 5% of the dry ligneous cellulose (wood) is effective. It is fully as effective as 40% urea, where the degradation of alpha cellulose into beta cellulose and gamma cellulose is concerned. In the same way urea protects pentosans from hydrolysis.

The results of use of n-butyl alcohol and n-amyl alcohol are generally the same, but for some effects one is preferred to the other. For example butanol gives a better yield of Cross & Bevan cellulose and of alpha cellulose than does n-amyl alcohol.

Temperature for digestion may vary over a wide range, say from 140° C. to 200° C. Lower cooking temperatures prolong the time for the process. Aspen cooked at 175° C. with a mixture of equal volumes of water and butyl alcohol required about three hours, but at 186° C. it requires only one and one-half hours. The same materials in process at 140° C. were not completed in eight hours, although extraction had well progressed and ligneous material was present in the digesting liquor. The preferred temperatures are practically the same as are used in the ordinary commercial chemical processes of cooking wood.

The amount of water may be varied over a wide range, and as it is increased beyond about equal parts of alcohol and water the time for the process is considerably prolonged. For aspen chips equal volumes of butanol and water give excellent results. For jack pine chips 60 to 70 volumes of butanol to 40 to 30 volumes of water give best results. It is also noted that aspen and jack pine under favorable conditions give different results when measured by the pulp obtained. Aqueous alcohol can extract ligneous material from both woods, but it appears that there is in jack pine some type of non-cellulosic material which resists extraction, and this type does not occur in aspen. Aspen readily yields substantially all of its non-cellulosic or ligneous material. In order to indicate the effect of varying water the following table of results with this variable is given:

*Jack pine chips—5-hour cooking time*

| Volume of butanol | Volume of water | % pulp (chips 100%) | Character of residue of extracted wood | % lignin left in residue (residue 100%) |
|---|---|---|---|---|
| 50 | 50 | 39.8 | Light colored pulp | 12.5 |
| 60 | 40 | 40.2 | Good pulp—no screenings | 18.8 |
| 70 | 30 | 43.9 | Pulp—raw—no screenings | 12.1 |
| 80 | 20 | 56.1 | Softened chips | 19.1 |
| 20 | 80 | 59.8 | Dark hard screenings | 38.3 |
| 30 | 70 | 56.5 | Dark hard screenings | 32.6 |

The details in the above table are not given herewith as completed and perfect examples of the present invention, inasmuch as these were carried out under fixed conditions to illustrate the effect in a five hour cooking period of varying the ratio of alcohol and water.

The ratio of chips or of other raw material to the volume of aqueous alcohol employed is not material, inasmuch as the process may be carried out by multiple extractions as well as in a batch process.

Numerous examples follow, which illustrate how the invention may be practiced.

*Example 1*

2.5 kg. of air-dry aspen chips were placed in a rotating digester together with 6 liters of water and 6 liters of normal butyl alcohol. The digester was closed and heated to a temperature of 185° C. and maintained at that temperature for a period of two hours, rotating the digester periodically. After two hours, the cooking liquor was displaced by an equal volume of hot liquor of the same composition and the contents were blown promptly from the digester. The spent cooking liquor when cooled separated into an upper butyl alcohol layer, intensely colored and containing substantially all of the extracted lignin material, and a lower straw-colored aqueous layer containing acids, sugars and the like. A total yield of 980 gms. of pulp was obtained. The pulp contained 2.0% of lignin (comparable to aspen cooked by the known "soda process") and required 4% of active chlorine to bleach to a good white color (comparable to the requirements for similar bleaching of soda-cooked aspen). The strength test of the pulp was also comparable to the soda-cooked aspen. Such pulp was beaten in a beater, and then felted into a good quality paper.

*Example 2*

Same as Example 1 except that at the end of one hour cooking time the cooking liquor and dissolved contents were displaced from the digester by an equal volume of hot fresh cooking liquor of the same composition as the original cooking liquor. The cooking was continued one additional hour after which the liquor was displaced with hot water slowly with a minimum of mixing, and the contents were blown from the digester. A yield of 51.0% of pulp (oven-dry) based on the oven-dry weight of the original wood was obtained. The withdrawn aqueous alcohol separated into two layers as in Example 1.

*Example 3*

2.5 kg. of air-dry jack pine chips and 12 liters of cooking liquor consisting of 6 volumes of normal butyl alcohol and 4 volumes of water were charged into a rotatable digester. The temperature was raised to 185° C. and maintained for 5 hours. After 5 hours the cooking liquor was completely displaced from the digester and solid contents. This replacing mixture was promptly displaced in the same way with hot clean liquor of the same alcohol-water composition. Then the contents were blown. The removed liquors separated on cooling into two layers, an upper butyl alcohol layer containing substantially all of the extracted ligneous material and a straw-colored water layer containing water soluble constituents. A total yield of 45.7% of extracted wood (oven-dry) was obtained based on the oven-dry weight of the original wood. The residue of extracted wood contained 10% of lignin, based on extracted wood as 100%.

*Example 4*

Same as Example 3 except spruce wood chips were used. An extracted wood yield of 50.5% based on the oven-dry weight of wood was obtained, the residual product containing 11.9% of lignin, based on extracted wood as 100%.

*Example 5*

100 gms. of air-dry aspen sawdust and 1.5 liters of cooking liquor consisting of equal volumes of normal amyl alcohol and water were charged into an autoclave. The temperature was raised to 175° C. and maintained for 4 hours. The contents were rapidly cooled in the autoclave and the products separated. The spent liquor separated on cooling into an upper black alcohol layer and a lower straw-colored water layer. A yield of 53% of cellulosic material was obtained.

*Example 6*

Same as Example 5 except iso-amyl alcohol was substituted for normal amyl alcohol. A yield of 54% of cellulosic material was obtained.

*Example 7*

100 gm. of air-dry aspen sawdust and 1.5 liters of a cooking liquor composed of equal volumes of normal butyl alcohol and water and 4.5 gms. of urea were charged into an autoclave. The temperature was maintained at 175° C. for 4 hours. The contents of the autoclave were cooled without opening the autoclave. On opening the digester, and emptying, the liquor and residue were readily separated. The spent liquor was recovered in two layers as in Example 6. A yield of 67.2% of cellulosic materials was obtained.

The urea functions by decomposition to provide ammonia which is available to neutralize acid formed in the digestion, thus preventing a low pH (high acidity) in the digester. The result is that the digestion takes place at a higher pH than where urea is not used. This minimizes loss of and degradation and alteration of celluloses and pentosans of the original wood. The same process as here described has been carried out omitting the urea, in order to show by comparison the benefits of urea. The comparison is as follows:

*Loss of wood constituents in process*

|  | Yield of pulp | Cross & Bevan cellulose | Alpha cellulose | Pentosans |
|---|---|---|---|---|
| Without urea | 54% | 20.2% | 8.8% | 77.0% |
| With urea | 67% | 10.1% | 1.4% | 49.0% |

In all of the cases the alcoholic layer is distilled to drive off the alcohol, using steam as a source of heat, in order not to burn the residue. The residue is plastic when hot, say about 100° C., and cools to a hard brittle mass which may or may not contain some alcohol residue. It may be ground to a chocolate-brown powder or redissolved in various solvents. Suitable solvents are alcohols, such as methyl, ethyl, propyl, butyl, and amyl, and the isomeric forms, the powder usually being only slightly soluble in the cold and increasingly soluble in hotter solvents. It is soluble in dioxan, glacial acetic acid, acetone and chloroform. It is insoluble in water. When it is intended to couple it with a diazotized amine to make dyestuffs, it may be dissolved in a solvent which is miscible with water, such as glacial acetic acid, acetone, dioxan, etc., and this solution mixed slowly with a water solution of diazotized amine in an acid or alkaline coupling as the case may require.

The process may be varied in numerous ways which will become apparent to those skilled in the art from the above description and explanation without departing from the invention as it is defined in the appended claims.

I claim:

1. The method of treating ligneous vegetable matter to remove non-cellulosic material therefrom, which comprises subjecting said matter to the digesting and extracting action of an aqueous alcoholic liquor at an elevated temperature, and removing the liquor from the solid residue, said aqueous alcoholic liquor being characterized by the act of separating into an aqueous layer and an alcoholic layer at a lower temperature, whereby there is selective separation in the said two layers of extracted material and a concentration of cellulosic material in the residual solid matter.

2. The method of treating ligneous vegetable matter to remove non-cellulosic material therefrom, which comprises subjecting said matter to the digesting and extracting action of an aqueous alcoholic liquor at an elevated temperature, and removing the liquor from the solid residue, said liquor being characterized by the presence of a homogeneous aqueous alcohol which at a lower temperature separates into an aqueous layer and an alcoholic layer, whereby there is selective separation in the said two layers of extracted material and a concentration of cellulosic material in the residual solid matter.

3. The method of treating ligneous vegetable matter to remove non-cellulosic material therefrom, which comprises subjecting said matter at an elevated temperature to the digesting and extracting action of water and an alcohol miscible with water at the digesting temperature and immiscible with the same amount of water at a lower temperature, separating the extracting liquor from solid residue, and cooling the liquor below the digesting temperature, whereby to obtain a separation of homogeneous aqueous alcohol into an aqueous layer and an alcoholic layer, thereby to secure separation in said layers of material extracted by the mixed water and alcohol.

4. The method of treating ligneous vegetable matter to remove non-cellulosic material therefrom, which comprises subjecting the said matter at an elevated temperature to the digesting and extracting action of a mixture of water and mono-hydroxy aliphatic alcohol having at least four carbon atoms of which at least three are in a straight chain, said water being present in sufficient amount to be immiscible with the alcohol at a temperature below the digesting temperature.

5. The method of treating ligneous vegetable matter to remove non-cellulosic material therefrom, which comprises subjecting the said matter at an elevated temperature to the digesting and extracting action of a mixture of water and mono-hydroxy aliphatic alcohol of the normal straight-chain structure having at least four carbon atoms in the chain, said water being present in sufficient amount to be immiscible with the alcohol at a temperature below the digesting temperature.

6. The method of treating ligneous vegetable matter to remove non-cellulosic material therefrom, which comprises subjecting said matter at an elevated temperature to the digesting and extracting action of a mixture of water and mono-hydroxy alcohol having in its structure the group

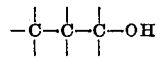

to one of the carbons of which there is attached another carbon atom, said water being present in sufficient amount to be immiscible with the alcohol at a temperature below the digesting temperature.

7. The method of treating ligneous vegetable matter to remove non-cellulosic material therefrom, which comprises subjecting said matter at an elevated temperature to the digesting and extracting action of a mixture of water and n-butyl alcohol, said water being present in sufficient amount to be immiscible with the alcohol at a temperature below the digesting temperature.

8. The method of treating ligneous vegetable matter to remove non-cellulosic material therefrom, which comprises subjecting said matter at an elevated temperature to the digesting and extracting action of a mixture of water and n-amyl alcohol, said water being present in sufficient amount to be immiscible with the alcohol at a temperature below the digesting temperature.

9. The method of treating ligneous vegetable matter to remove non-cellulosic material therefrom, which comprises subjecting said matter at an elevated temperature to the digesting and extracting action of a mixture of water and iso-amyl alcohol, said water being present in sufficient amount to be immiscible with the alcohol at a temperature below the digesting temperature.

10. The method of treating ligneous vegetable matter to remove non-cellulosic material therefrom, which comprises subjecting said matter at an elevated temperature to the digesting and extracting action of a mixture of alcohol and water in the presence of urea, whereby said urea is available to supply ammonia which neutralizes acid generated in the digesting process.

11. A composition of matter comprising an aqueous mixture of water and alcohol in miscible proportions containing material extracted by the mixture from ligneous vegetable matter, said mixture being characterized by the act of separating on cooling into an aqueous layer and an alcoholic layer, whereby the extract is divisible into one portion dissolved in the aqueous layer, and another portion dissolved in the alcoholic layer.

12. A composition of matter comprising an aqueous mixture of water and n-butyl alcohol in miscible proportions containing material extracted by the mixture from ligneous vegetable matter, said mixture being characterized by the act of separating on cooling into an aqueous layer and an alcoholic layer, whereby the extract is divisible into one portion dissolved in the aqueous layer, and another portion dissolved in the alcoholic layer.

13. A composition of matter comprising an aqueous mixture of water and n-amyl alcohol in miscible proportions containing material extracted by the mixture from ligneous vegetable matter, said mixture being characterized by the act of separating on cooling into an aqueous layer and an alcoholic layer, whereby the extract is divisible into one portion dissolved in the aqueous layer, and another portion dissolved in the alcoholic layer.

14. A composition of matter comprising an aqueous mixture of water and iso-amyl alcohol in miscible proportions containing material extracted by the mixture from ligneous vegetable matter, said mixture being characterized by the act of separating on cooling into an aqueous layer and an alcoholic layer, whereby the extract is divisible into one portion dissolved in the aqueous layer, and another portion dissolved in the alcoholic layer.

15. The method of treating wood which comprises subjecting wood in small particles at an elevated temperature to the digesting and extracting action of a mixture of water and mono-hydroxy alcohol having the essential grouping

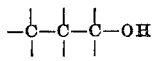

to which another carbon atom is attached, said water being present in sufficient amount to be immiscible with the alcohol at a temperature below the digesting temperature, whereby non-cellulosic material is removed from the wood, and the woody structure is softened and its fibers rendered separable for use as a pulp.

16. The method of treating aspen wood which comprises subjecting aspen in a form comparable to chips at an elevated temperature to the digesting and extracting action of a mixture of water and mono-hydroxy alcohol having the essential grouping

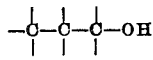

to which another carbon atom is attached, said water being present in sufficient amount to be immiscible with the alcohol at a temperature below the digesting temperature, and continuing the action until substantially all the non-cellulosic material is removed from the wood, and the residual wood is converted into a cellulose pulp, comparable to chemical cellulose pulp from aspen and suitable for paper making.

17. Non-cellulose material including ligneous substance, which material is soluble in a homogeneous mixture of alcohol and water at an elevated temperature, which mixture at a lower temperature separates into an aqueous layer and an alcoholic layer, said material being also soluble in said alcoholic layer, and being free from substance soluble in the aqueous layer, and soluble in the first-mentioned aqueous alcohol at said elevated temperature.

18. The method of treating ligneous vegetable matter to remove non-cellulosic material therefrom which comprises subjecting said matter to the digesting and extracting action of an aqueous alcoholic liquor at an elevated temperature, said liquor containing soluble inorganic chemical, and removing the liquor from the solid residue, said aqueous alcoholic liquor being characterized by the act of separating into an aqueous layer and an alcoholic layer at a lower temperature, whereby there is a selective separation in the said two layers of extracted material and a concentration of cellulosic material in the residual solid matter, a concentration of said inorganic chemical in the aqueous layer, and a concentration of ligneous material in the alcoholic layer.

19. The method of treating ligneous vegetable matter to remove non-cellulosic material therefrom which comprises subjecting said matter to the digesting and extracting action of an aqueous alcoholic liquor at an elevated temperature, said liquor containing soluble inorganic alkaline material as a protective agent to minimize the changes in the celluloses and pentosans of the vegetable matter, and removing the liquor from the solid residue, said aqueous alcoholic liquor being characterized by the act of separating into an aqueous layer and an alcoholic layer at a lower temperature, whereby there is a selective separation in the said two layers of extracted material and a concentration of cellulosic material in the residual solid matter, a concentration of said inorganic alkaline material or products derived therefrom in the aqueous layer, and a concentration of ligneous material in the alcoholic layer.

20. The method of treating ligneous vegetable matter to remove non-cellulosic material therefrom which comprises subjecting said matter to the digesting and extracting action of an aqueous alcoholic liquor at an elevated temperature, said liquor containing a protective agent providing for minimizing acidity produced in the digestion, whereby to minimize changes in the cellulose and pentosans of the original vegetable matter, and removing the liquor from the solid residue, said aqueous alcoholic liquor being characterized by the act of separating into an aqueous layer and an alcoholic layer at a lower temperature, whereby there is a selective separation in the said two layers of extracted material and a concentration of cellulosic material in the residual solid matter.

21. The method of treating ligneous vegetable matter to remove non-cellulosic material therefrom which comprises subjecting said matter to the digesting and extracting action of an aqueous alcoholic liquor at an elevated temperature, said liquor containing urea as a protective agent providing for minimizing acidity produced in the digestion, whereby to minimize changes in the cellulose and pentosans of the original vegetable matter, and removing the liquor from the solid residue, said aqueous alcoholic liquor being characterized by the act of separating into an aqueous layer and an alcoholic layer at a lower temperature, whereby there is a selective separation in the said two layers of extracted material and a concentration of cellulosic material in the residual solid matter.

SAMUEL I. ARONOVSKY.